(12) United States Patent
Baus et al.

(10) Patent No.: US 6,872,039 B2
(45) Date of Patent: Mar. 29, 2005

(54) SELF-LOCKING PIN

(75) Inventors: Romy Baus, Rubicon, WI (US); Harry Swenson, III, Hustisford, WI (US)

(73) Assignee: Pivot Point, Incorporated, Hustisford, WI (US)

( * ) Notice: Subject to any disclaimer, the term of this patent is extended or adjusted under 35 U.S.C. 154(b) by 0 days.

(21) Appl. No.: 10/421,336

(22) Filed: Apr. 23, 2003

(65) Prior Publication Data

US 2004/0218992 A1 Nov. 4, 2004

(51) Int. Cl.[7] .................................................. F16B 21/00
(52) U.S. Cl. ...................................................... 411/347
(58) Field of Search ............................... 411/347, 348, 411/508, 509, 913

(56) References Cited

U.S. PATENT DOCUMENTS

| 1,621,624 | A |   | 3/1927  | Campo         |         |
|-----------|---|---|---------|---------------|---------|
| 2,361,491 | A |   | 10/1944 | Nagin         |         |
| 2,945,411 | A |   | 7/1960  | Thompson      |         |
| 3,046,827 | A | * | 7/1962  | Myers         | 411/348 |
| 3,561,516 | A |   | 2/1971  | Reddy         |         |
| 3,645,160 | A | * | 2/1972  | Artiolli et al. | 411/347 |
| 4,297,063 | A |   | 10/1981 | Hart          |         |
| 4,464,090 | A |   | 8/1984  | Duran         |         |
| 4,655,657 | A |   | 4/1987  | Duran         |         |
| 4,725,174 | A | * | 2/1988  | Silcox        | 411/347 X |
| 4,759,671 | A |   | 7/1988  | Duran         |         |
| 5,193,956 | A | * | 3/1993  | Duran         | 411/348 X |
| 5,224,806 | A | * | 7/1993  | Duran         | 411/348 X |
| 5,947,668 | A |   | 9/1999  | Thommes       |         |
| 6,679,665 | B2 | * | 1/2004 | Lee           | 411/347 |

FOREIGN PATENT DOCUMENTS

DE  198 20 181 A1  11/1999

* cited by examiner

Primary Examiner—William L. Miller
(74) Attorney, Agent, or Firm—Ryan Kromholz & Manion, S.C.

(57) ABSTRACT

A self-locking pin having a shaft, a headed end, and detent means biased in a bore in the pin. The portion of the detent or plunger that extends outwardly from the bore is wedge-shaped, while the portion of the plunger disposed inside the bore is cylindrical. A transitional angle is formed at the point where the configuration of the plunger changes from cylindrical to wedge-shaped. The transitional angle defines shoulders on either side of the plunger. The shaft is staked at points along the perimeter of the bore so that the inwardly extending surface created by the staking abuts the shoulders and prevents the plunger from rotating or being removed from the bore. In an alternate embodiment, the plunger may be rotated to a locked depressed position.

16 Claims, 9 Drawing Sheets

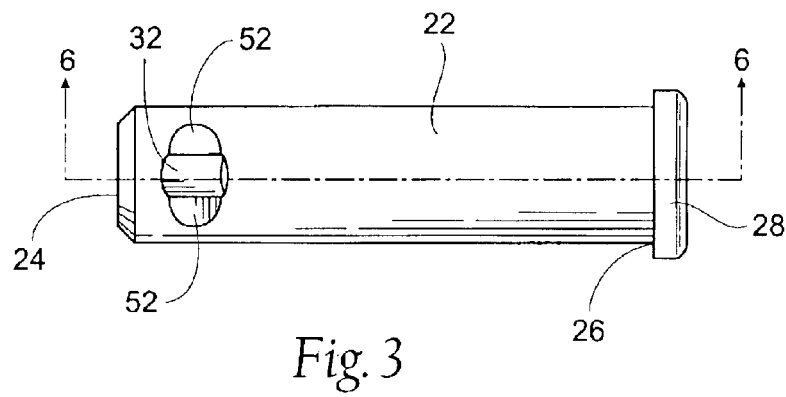
*Fig. 3*
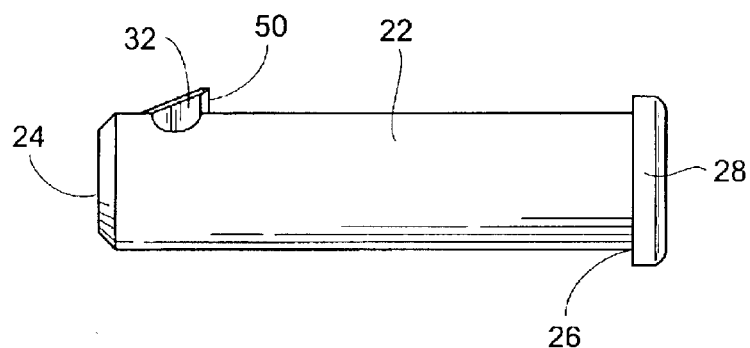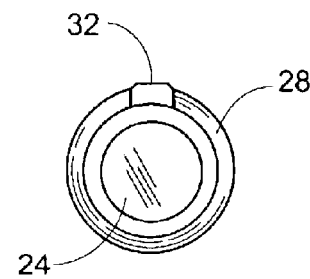
*Fig. 4*  *Fig. 5*
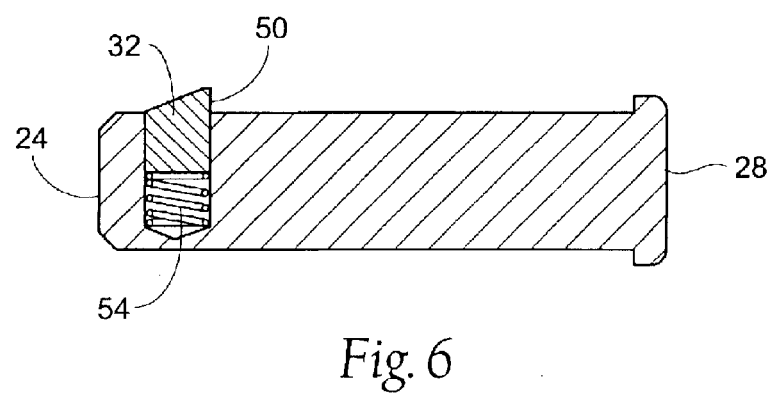
*Fig. 6*

SELF-LOCKING PIN

BACKGROUND OF THE INVENTION

1. Field of Invention

The invention relates to fasteners, namely threadless fasteners and more particularly to a threadless fastener for retaining two or more structures through apertures formed in each structure.

Detent pins are well known in industry. Many of these pins fall into the category of safety bolts. Safety bolts have a threaded end to which a nut can be attached to as well as a detent mechanism along the length of the bolt. The main fastening mechanism in safety bolts is threading the nut on the end of the bolt. These products are often used in the aircraft industry so an extra safety factor is present in case vibrations cause the nut to loosen or someone forgets to tighten the nut. The detent mechanism is this extra safety factor. However, these dual fasteners make safety bolts more difficult and thus more expensive to manufacture. Additionally there are some applications where such a bolt cannot be used because it is either impractical or impossible to access the threaded end of the bolt after it is inserted through an aperture. Also, screwing the nut on the end of the bolt causes an increase in assembly time.

Cotter pins are also well known in industry. A bolt with a cotter way is inserted through an aperture. A cotter pin is then inserted through the cotter way so the bolt cannot be removed from the aperture. It is thus obvious that access to the backside of the workpiece is necessary for a cotter pin to be utilized. Here again, insertion of the cotter pin in the cotter way is an extra step that will take more time during assembly.

There is a need in the market for a self-locking pin which is simple to manufacture and can be installed with little effort and in applications where there is no access to the opposing side of the workpiece and thus a nut cannot be applied to the threaded end of a pin.

2. Description of Prior Art

One type of prior art bolt is disclosed in U.S. Pat. No. 4,759,671 to Duran. Duran discloses a self-retaining bolt assembly in which the detent is a solid spherically shaped ball element with cut out sections and these cut out sections must be configured to saddle protuberances in the hole to prevent rotation. The periphery of the hole is peened in order to retain the detent in the hole. The shaft and detent of this bolt must both be machined carefully to assure a proper fit and retention for the detent.

Another prior art bolt is disclosed in U.S. Pat. No. 3,561,516 to Reddy. Reddy discloses a bolt with diametrically opposed detents slidably disposed in one hole. Each detent has a lateral passage with a sloped cam surface. These sloped cam surfaces engage a cam member which retains the detents in the hole. The detents are pulled into the hole when a force is exerted on the cam surface of the cam member by the cam surfaces of the detents. The detents are moved outwardly by the biasing means disposed between the detents. A number of carefully machined parts, which are difficult to install properly, are required. Additionally, the passageway extending along the axis of the bolt weakens the bolt.

A prior art bolt is disclosed in U.S. Pat. No. 2,361,491 to Nagin. Nagin disclosed a detent, generally circular in section, with a 45-degree slope at the upper end. A V-shaped groove with plane cam faces is formed in the body of the detent. The detent is slidably disposed in a hole in the shank. A circular passage extends along the bolt axis. A pin is slidably disposed in this passage. The pin is biased with a spring to engage the V-shaped groove and retain the detent in the hole. This bolt also must be carefully machined and installed to operate correctly. Additionally the passage in the shaft weakens the bolt.

SUMMARY OF THE INVENTION

The present invention, a self-locking pin, provides a pin with a uniquely shaped detent or plunger, which facilitates easy installation of the pin through an aperture in an object. In addition, the novel plunger in combination with a staking process non-rotatably retains the detent in its hole.

In one embodiment the self-locking pin has an elongated shaft with a first end and a second headed end. The shaft has a hole bored in it with a plunger slidably disposed in the hole. The plunger has a lower cylindrical portion and an upper wedge-shaped portion. A shoulder is formed on the lateral sides of the plunger where these two portions meet. The plunger is biased in the hole. The shaft of the pin is staked on lateral sides of the plunger with a perpendicular radius punch to retain the plunger in the hole. The location of the staking corresponds to the plunger's shoulders.

In an alternate embodiment, the plunger is formed with shoulders on its leading and trailing sides. In this embodiment, the shaft is then staked on the leading and trailing sides of the plunger.

In yet another embodiment, the plunger is formed with a shoulder only on its trailing side. In this embodiment, the shaft is staked on the trailing side of the plunger.

In a final embodiment, the hole is bored through the entire shaft. Two plungers are then disposed in the hole and each opening to the hole is staked on lateral sides of the plungers.

The plunger can have different shapes depending upon the application. Another alternate embodiment includes a plunger that can be locked in its depressed position allowing the pin to be freely inserted or removed until the plunger is unlocked.

BRIEF DESCRIPTION OF THE DRAWINGS

FIG. 3 is a top plan view of the pin of FIG. 1.

FIG. 4 is a side elevation view of the pin of FIG. 1.

FIG. 5 is an end elevation view of the pin of FIG. 1.

FIG. 6 is a cross sectional view of the pin of FIG. 3 taken along line 6—6 of FIG. 3.

DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. While the preferred embodiment has been described, the details may be changed without departing from the invention, which is defined by the claims.

Figure 1:
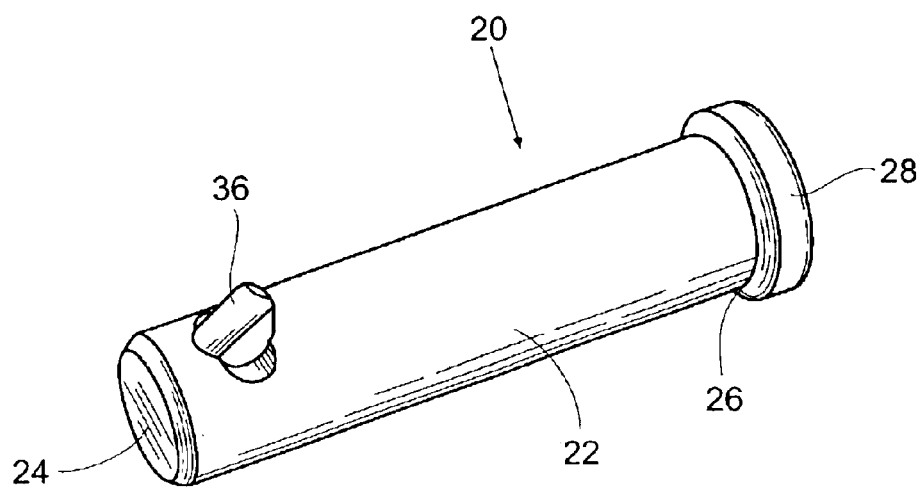
FIG. 1 is a perspective view of a pin in accordance with the invention.

FIG. 1 illustrates the presently preferred embodiment of the self-locking pin 20 according to the invention. The pin 20 has a generally cylindrical shaft 22 with a first end 24 and a second end 26. The second end 26 may have an enlarged head 28.

Figure 2:
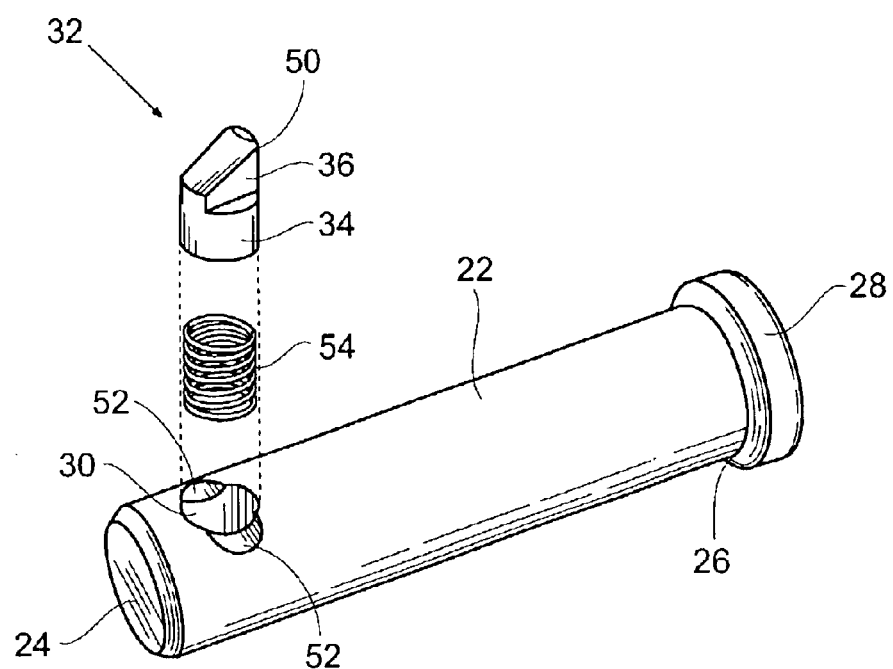
FIG. 2 is an exploded perspective view of the pin in FIG. 1.
Figure 2A:
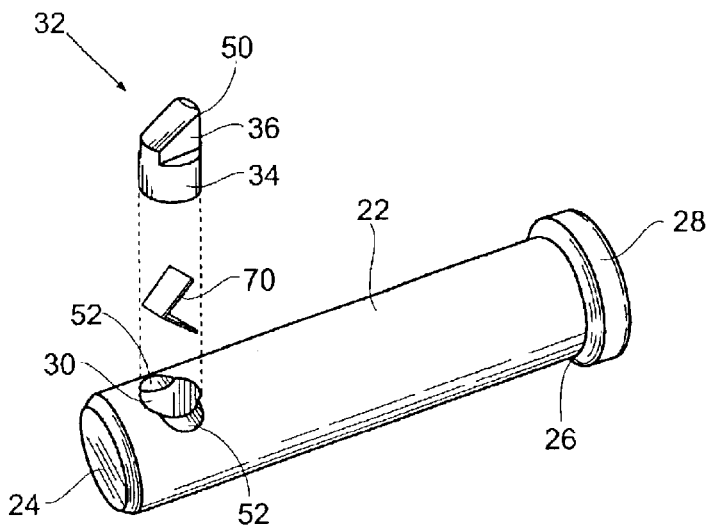
FIG. 2A is an alternate exploded perspective view of the pin in FIG. 1.
Figure 2B:
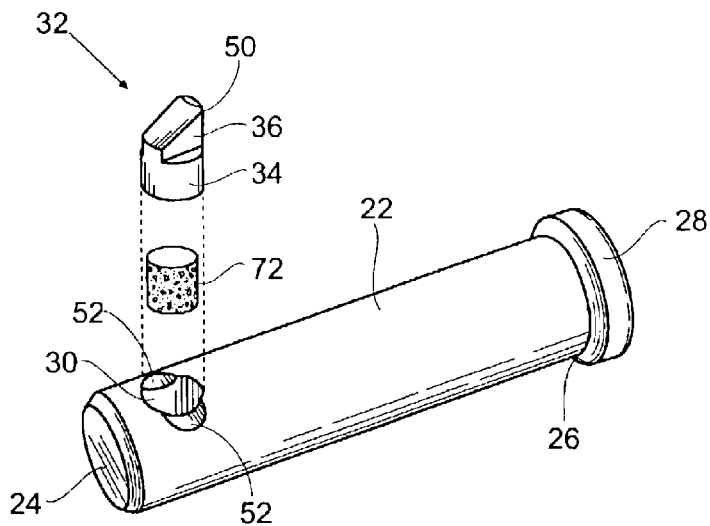
FIG. 2B is another alternate exploded perspective view of the pin in FIG. 1.
Figure 2C:
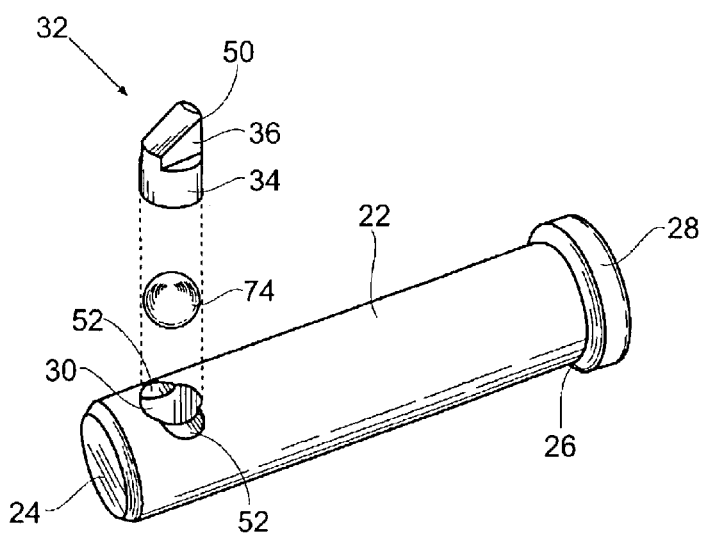
FIG. 2C is yet another alternate exploded perspective view of the pin in FIG. 1.

As seen in FIG. 2, a re-entrant bore 30 extends partway though the shaft 22 near the first end 24. The bore 30 extends radially inwardly towards the axis of the shaft. The bore 30 may or may not intersect the central longitudinal axis of the shaft. A plunger 32 is slidably disposed in the bore 30. The plunger 32 has a cylindrical portion 34 and a wedge-shaped portion 36. The plunger sits upon a helical coil spring 54. As shown in FIG. 2A, a leaf spring 70 may be used as the biasing means. As shown in FIG. 2B, compressible material 72 may be used as the biasing means. As shown in FIG. 2C, an elastic material 74 may be utilized as the biasing means.

FIGS. 3, 4, and 5, show views of the pin 20 from the top, side, and end respectively.

FIG. 6 shows a cross section of the pin 20. This illustrates the spring 54 biasing the plunger 32. While the preferred embodiment uses a helical coil spring, other acceptable biasing means such as, but not limited to, a leaf spring, or a cushion of sufficiently elastic material could be utilized.

The plunger 32 can either sit directly on top of the spring 54, or a cavity 56 can be counter-bored in the bottom surface of the plunger 32 to act as a spring seat and retain the spring 54. The phantom lines in FIG. 10 denote this cavity 56.

Figure 7:
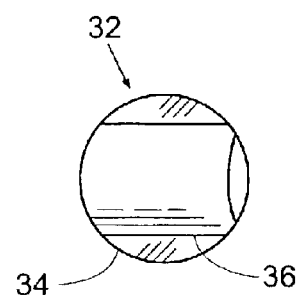
FIG. 7 is a top plan view of the wedge-shaped plunger of FIG. 2.
Figure 8:
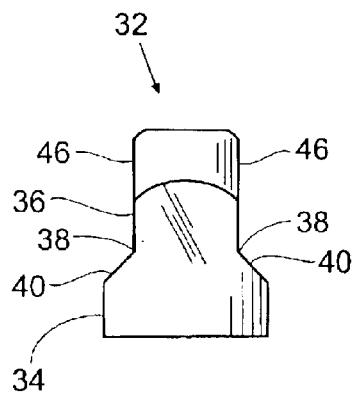
FIG. 8 is a front elevation view of the wedge-shaped plunger of FIG. 7.
Figure 9:
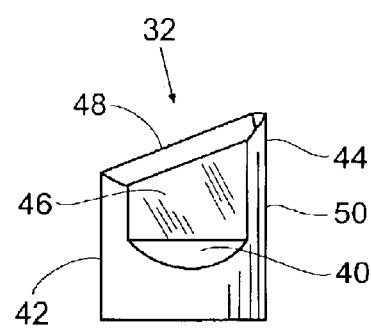
FIG. 9 is a side elevation view of the wedge-shaped plunger of FIG. 8.

The preferred embodiment of the plunger is further illustrated in FIGS. 7, 8, and 9. The plunger 32 has a transitional angle 38 at the point where the configuration of the plunger 32 changes from cylindrical 34 to wedge-shaped 36. This transitional angle 38 forms a tapered shoulder 40. As will be described hereinafter, the shoulder 40 helps retain the plunger 32 in the bore 30. Referring to FIG. 9, the side of the wedge-shaped portion proximate to the first end 24 of the pin 20 is the wedge leading side 42. The side of the wedge-shaped portion proximate to the second end 26 of the pin 20 is the wedge trailing side 44. As seen in FIG. 8, the wedge also has oppositely disposed lateral sides 46. In the preferred embodiment, shoulders 40 are formed on each of the lateral sides 46 of the plunger 32. An abutment 50 is formed on the side opposite leading side 42.

As can be best seen in FIGS. 1 and 4, when the plunger 32 is in its normal position in the bore 30, the cylindrical portion 34 resides below the surface of the shaft 22 and the wedge-shaped portion 36 extends above the surface of the shaft 22. Referring to FIGS. 4 and 9, the wedge leading side 42 of the plunger 32 is proximate the surface of the shaft 22. The top surface of the plunger 32 extends angularly upwardly away from the surface of the shaft 22 to define a ramped engaging surface 48 and the abutment 50. The abutment 50 is perpendicular or normal to the axis of the shaft 22 and faces the direction of the second end 26.

The plunger 32 and shaft 22 could be made from any suitable materials such as, but not limited to, alloy steels, carbon steels, stainless steel, or aluminum alloys.

Figure 10:
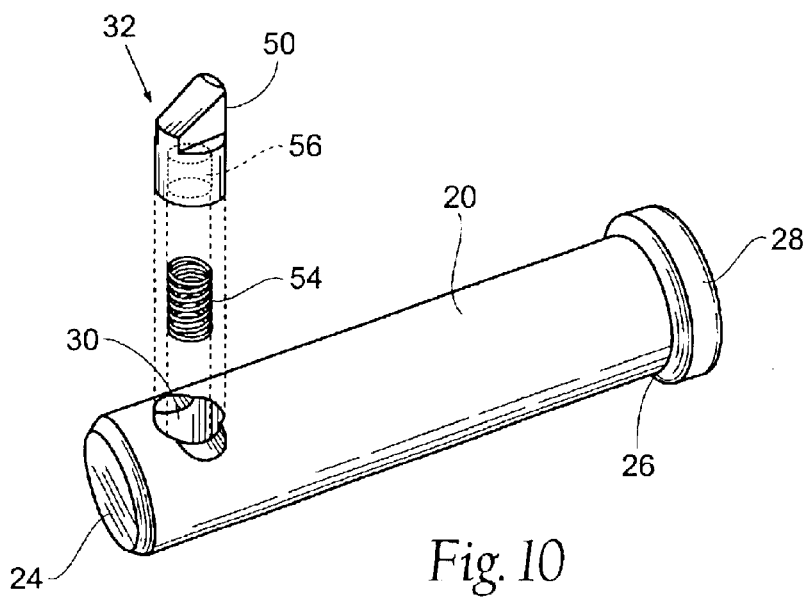
FIG. 10 is an exploded perspective view of an alternate embodiment of the pin of FIG. 1 with a spring retaining cavity.
Figure 14:
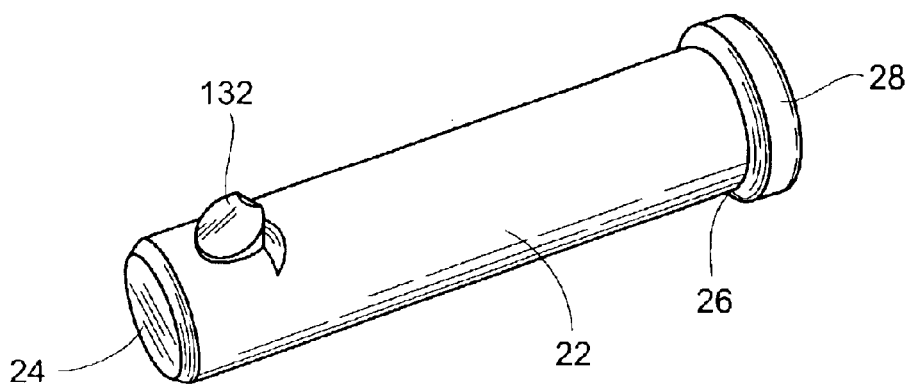
FIG. 14 is a perspective view of the pin of FIG. 1 using the wedge-shaped plunger of FIG. 11.
Figure 15:
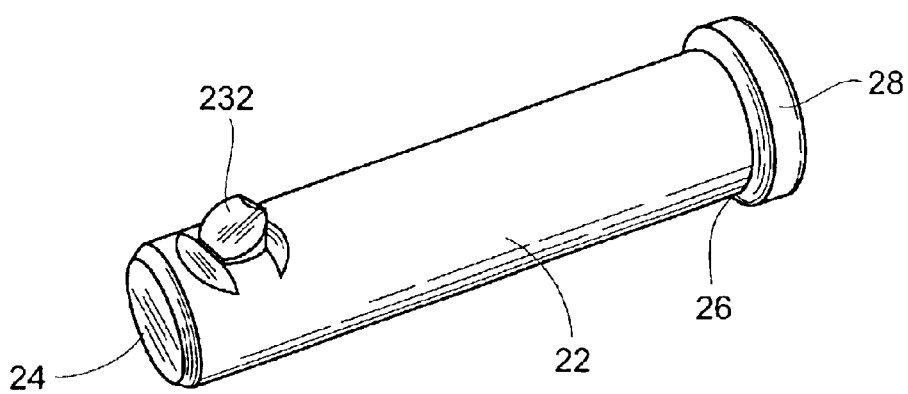
FIG. 15 is a perspective view of the pin of FIG. 1 using the wedge-shaped plunger of FIG. 11A.

To assemble the self-locking pin 20, the spring 54 is first placed in the re-entrant bore 30. Next, the plunger 32 is placed in the bore 30 in the correct orientation. The pin 20 is held in place, with the plunger 32 in its depressed position, by one tool while another tool punches the shaft 22 using a radius stake punch perpendicular to the pin 20. The staking 52 causes a change in the shape of the shaft 22 around the entrance to the bore 30. The smooth round bore 30 is formed to a substantially oval shape with some depth as best shown in FIGS. 2 and 3. In the preferred embodiment, the shaft 22 is staked on the lateral sides of the wedge. The staking 52 forms inwardly extending marginal portions. This is best shown in FIG. 10. These inwardly extending portions abut the shoulder 40 of the plunger 32 (see FIGS. 7 through 9) as the spring 54 urges the plunger 32 outwardly of the bore 30. The edge of the staking 52 abuts the flat lateral sides 46 and surface 40 of the plunger 32 and prevents the plunger 32 from rotating or being removed from the bore 30. Alternately, and as shown in FIGS. 14 and 15 respectively, a single stake may be placed behind the plunger or a pair of stakes may be placed in front of and behind the plunger.

Figure 11:
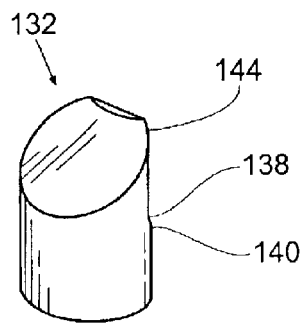
FIG. 11 is a perspective view of an alternate embodiment of the wedge-shaped plunger of FIG. 2.
Figure 11A:
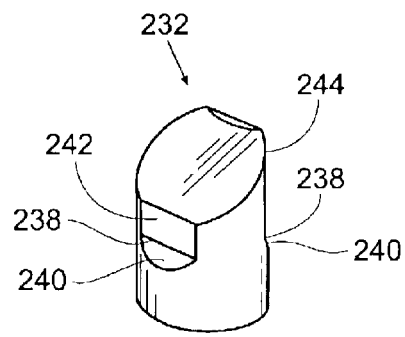
FIG. 11A is a perspective view of another alternate embodiment of the wedge-shaped plunger of FIG. 2.

FIGS. 11 and 11A show first alternate embodiments of the plunger. The plunger 132 embodied in FIG. 11 has a transitional angle 138 on only the wedge trailing side 144. This creates only one shoulder 140, which is located on the wedge trailing side 144. Using this plunger 132 embodiment, the shaft 22 is preferably staked only on the plunger trailing side as shown in FIG. 14.

The plunger 232 embodied in FIG. 11A has transitional angles 238 on both the wedge trailing side 244 and the wedge leading side 242. This creates shoulders 240 on both the wedge trailing side 244 and the wedge leading side 242. Using this plunger 232 embodiment, the shaft is preferably staked on both the wedge trailing side 244 and the wedge leading side 242 as shown in FIG. 15.

Figure 12:
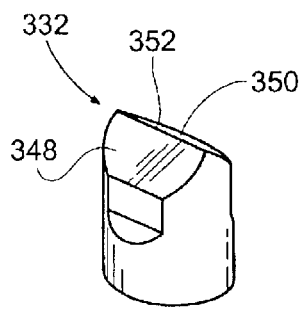
FIG. 12 is a perspective view of a double-wedged embodiment of the plunger.
Figure 12A:
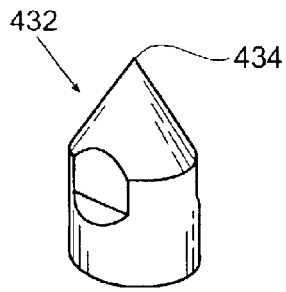
FIG. 12A is a perspective view of a conical embodiment of the plunger.
Figure 12B:
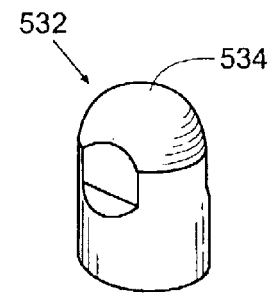
FIG. 12B is a perspective view of a radiused embodiment of the plunger.

FIGS. 12, 12A and 12B show other alternate embodiments of the plunger. FIG. 12 depicts a double-wedge plunger 332 having opposite ramped engaging surfaces 348, 350 that meet at an edge 352. FIG. 12A shows a conical plunger 432 terminating at a point 434 and FIG. 12B depicts a radiused plunger 532 having a smooth, domed top 534. It is to be understood that any of the plungers could be staked in any of the pins as described.

Figure 13:
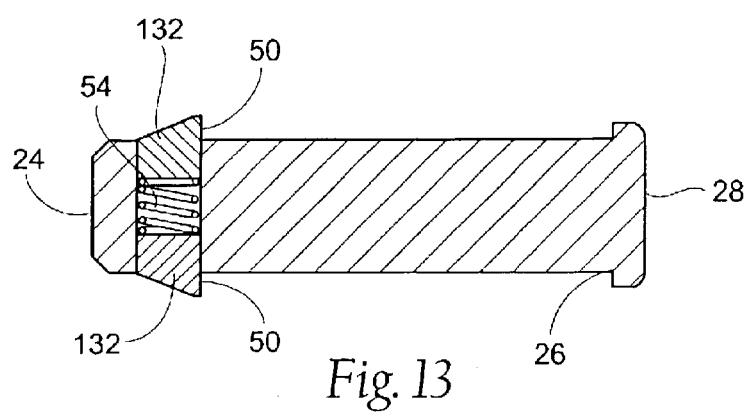
FIG. 13 is a cross sectional view of an alternative embodiment of the pin with two wedge-shaped plungers taken along line 13—13 of FIG. 16.
Figure 16:
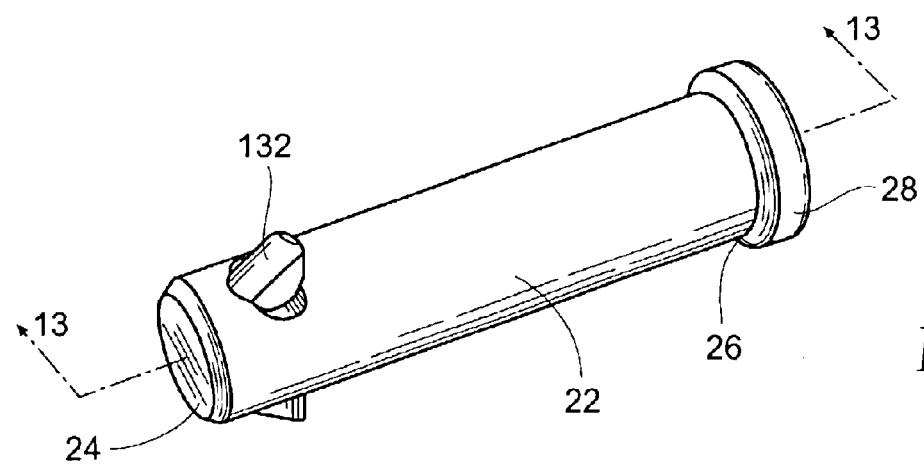
FIG. 16 is a perspective view of the pin of FIG. 13.

FIGS. 13 and 16 show an alternate embodiment of the self-locking pin 20 in which two plungers 132 are utilized. As shown in FIG. 13, the two plungers 132 are disposed in one bore 30. The plungers 132 are separated by a spring 54, biasing each plunger 132 in an outward direction. Each plunger 132 is of the preferred embodiment of the plunger 132. The shaft 22 is staked on the lateral sides 46 of each plunger 132.

Figure 17:
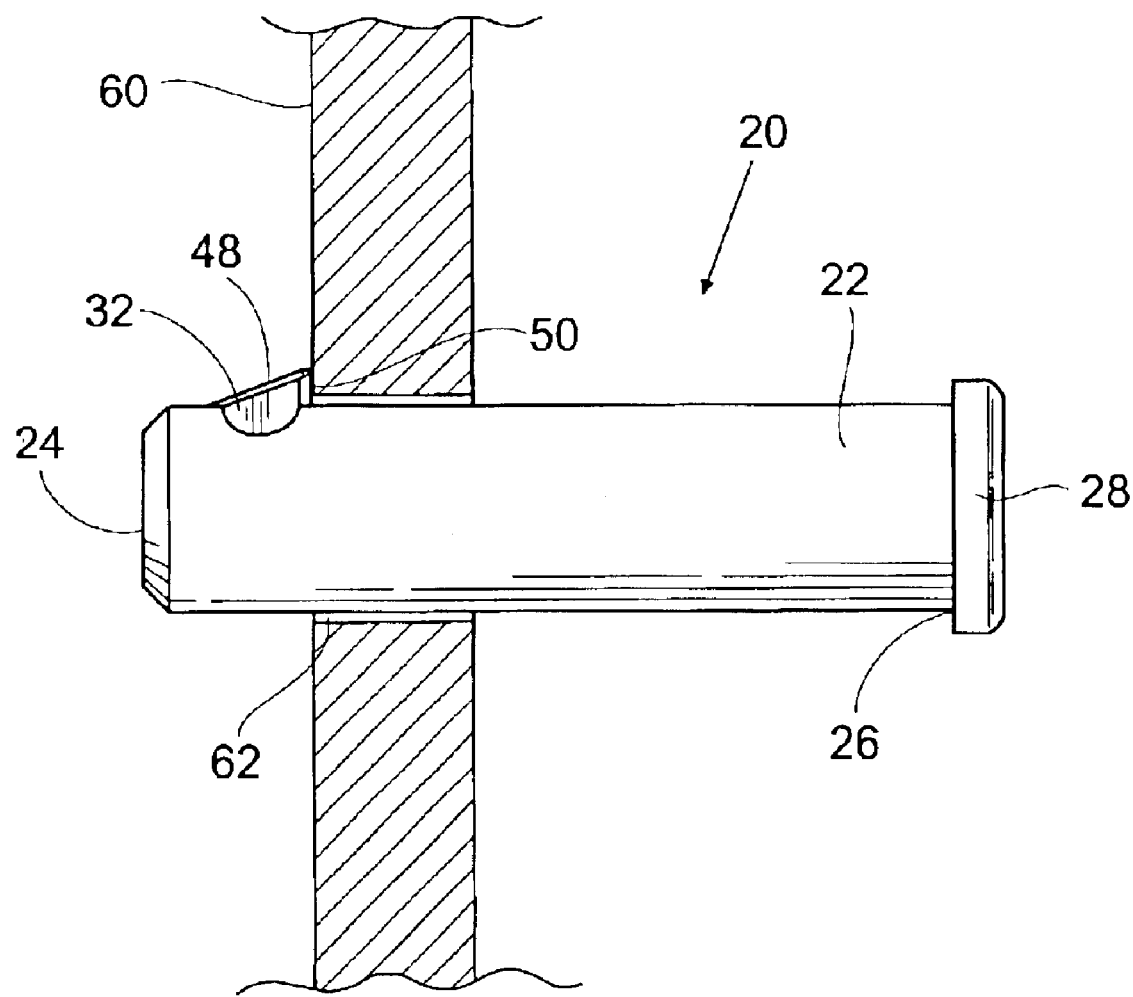
FIG. 17 is a side elevation view of the pin of FIG. 1 installed in an aperture through a panel.
Figure 18:
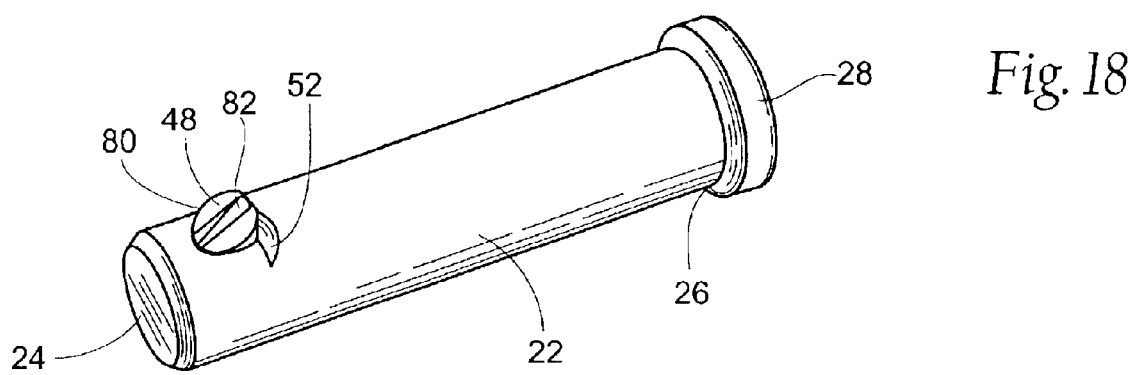
FIG. 18 is a perspective view of another alternate embodiment pin, similar to the pin shown in FIG. 14.

FIG. 17 shows the self-locking pin 20 inserted through an aperture. In regular use, the self-locking pin 20 is inserted through an aperture in at least one object with a restraining surface 60. The ramped engaging surface 48 of the plunger 32 abuts the inner surface 62 of the aperture. The force of the inner surface 62 of the aperture against the ramped engaging surface 48 of the plunger 32 causes the plunger 32 to be pushed inwardly against the bias of the spring 54 into the bore 30 until the abutment 50 is no longer exposed. The pin 20 can then be installed completely by continuing to push the pin 20 through the aperture. Once the pin 20 is installed and the ramped engaging surface 48 clears the aperture the plunger 32 pops back up against the bias of the spring 54. As shown in FIG. 17, the flat abutment 50 of the plunger 32 abuts the restraining surface 60 of the object, preventing the pin 20 from being withdrawn from the aperture in a similar manner.

Figure 19:
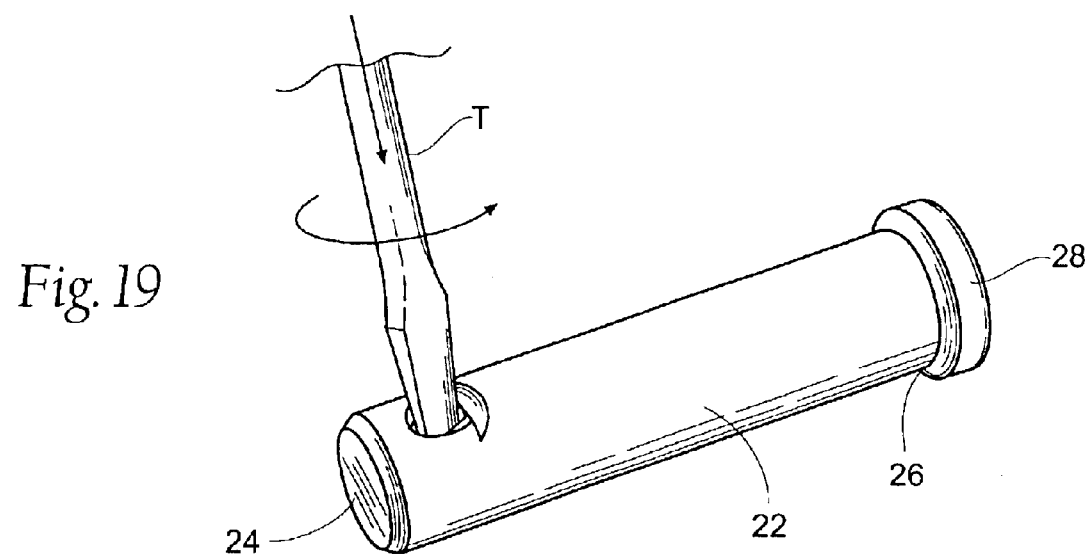
FIG. 19 is a perspective view of the alternate embodiment pin showing the plunger being locked.
Figure 20:
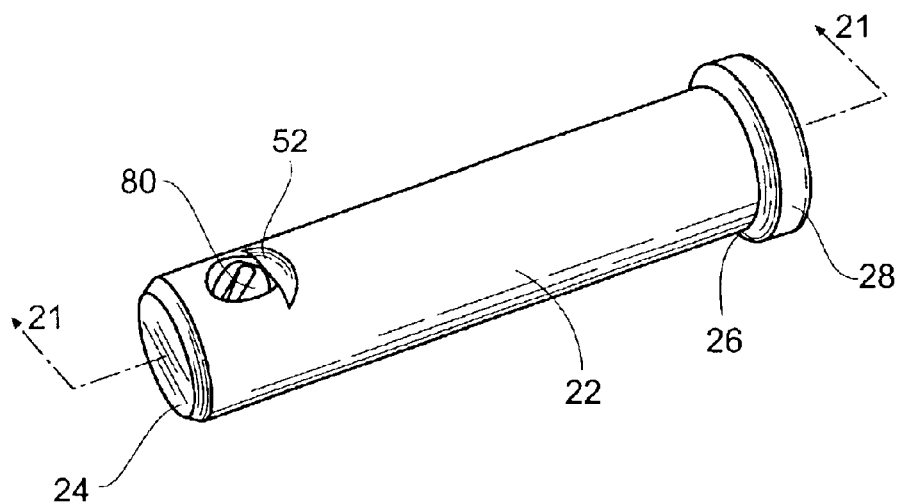
FIG. 20 is a perspective view of the alternate embodiment pin with the plunger locked.
Figure 21:
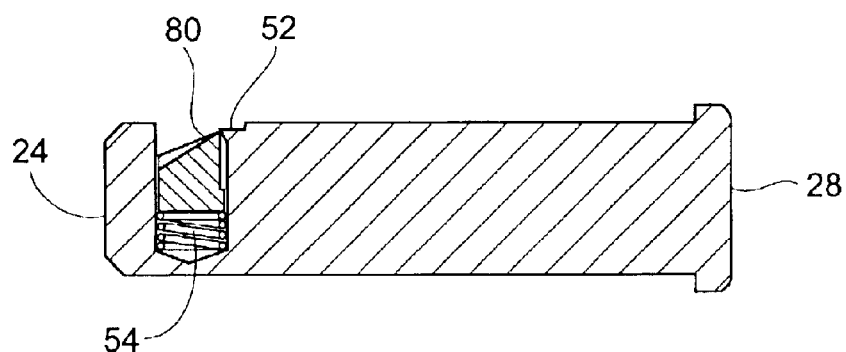
FIG. 21 is a cross-section view taken along line 21—21 of FIG. 20 showing the locked plunger.

FIGS. 18 through 21 show an alternate embodiment of the self-locking pin 20 further including a lockable plunger 80. Plunger 80 includes a recess 82 formed in its ramped engaging surface 48 for receiving a tool T. A single stake 52 is placed behind the plunger 80. When partially depressed (typically with the use of the tool) the plunger 80 may be rotated, as shown in FIG. 19. The rotation allows plunger 80 to be trapped beneath the stake 52 and therefore hold the plunger in a depressed or retracted position (see FIG. 21). Rotating the plunger 80 in either direction allows the plunger to return to its former position where it can be freely depressed and extended. Alternately, the orientation of the plunger may be changed by one hundred eighty degrees (180 degrees).

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A self-locking pin comprising;
   an elongated shaft;
   at least one cylindrical re-entrant bore intersecting said shaft;
   at least one plunger, said plunger including a cylindrical portion slidably disposed in said bore and a wedge-shaped portion extendable outwardly of said re-entrant bore, said wedge-shaped portion including a laterally extending, substantially planar surface;
   biasing means disposed in said re-entrant bore, and biasing said plunger outwardly of said bore;
   said shaft being staked on at least one side of the entrance of said re-entrant bore to provide a marginal surface extending angularly relative to the longitudinal axis of said shaft, and further being engagable with said planar surface to thereby restrain said plunger from rotation within said bore.

2. A self-locking pin as claimed in claim 1 wherein said shaft has a first end and a second end.

3. A self-locking pin as claimed in claim 2 wherein said second end comprises an enlarged headed portion.

4. A self-locking pin as claimed in claim 1 wherein the longitudinal axis of said re-entrant bore extends radially inwardly and substantially perpendicular to the longitudinal axis of said shaft.

5. A self-locking pin as claimed in claim 1 wherein said biasing means comprises a helically wound compression spring.

6. A self-locking pin as claimed in claim 5 wherein said plunger includes a spring-retaining cavity in the bottom surface thereof.

7. A self-locking pin as claimed in claim 1 wherein said biasing means comprises a leaf spring.

8. A self-locking pin as claimed in claim 7 wherein said plunger incluides a spring-retaining cavity in the bottom thereof.

9. A self-locking pin as claimed in claim 1 wherein said biasing means comprises a compressible material.

10. A self-locking pin as claimed in claim 9 wherein said plunger includes a material-retaining cavity in the bottom surface thereof.

11. A self-locking pin as claimed in claim 1 wherein said biasing means comprises an elastic material.

12. A self-locking pin as claimed in claim 11 wherein said plunger includes a material-retaining cavity in the bottom surface thereof.

13. A self-locking pin as claimed in claim 1, wherein at least a portion of the surface of said plunger is formed to provide an angularly disposed transitional shoulder portion extending between said wedge-shaped portion and said cylindrical portion, and wherein said marginal surface is engagable with said shoulder portion.

14. A self-locking pin as claimed in claim 13 wherein said wedge-shaped portion has a leading edge being positioned closest to the first end of said shaft, said leading edge of said wedge-shaped portion being proximate to said shaft surface and said wedge-shaped portion extending angularly upward of said shaft to define a ramped abutting surface, said ramped abutting surface terminating in an abutment and facing the second end of said shaft.

15. A self-locking pin as claimed in claim 14 wherein said plunger has two lateral sides, said transitional angle defining shoulders on each lateral side, where said shaft is staked to provide inwardly extending marginal portions adapted to abut said shoulders.

16. A self-locking pin to be inserted through an aperture in at least one object wherein said object terminates in a restraint surface to retain the pin in the aperture, said pin comprising:
   an elongated shaft including a first end and a second end;
   at least one cylindrical re-entrant bore intersecting said shaft, said bore extending radially inwardly towards the axis of said shaft;
   at least one plunger slidably disposed in said bore, said plunger having a cylindrical portion and a wedge-shaped portion, a leading edge of said wedge-shaped portion being positioned closest to the first end of said shaft, said leading edge of said wedge-shaped portion being proximate to said shaft surface and said wedge-shaped portion extending angularly upwardly of said shaft surface to define a ramped engaging surface adapted for engagement with the object aperture surface, said ramped engaging surface terminating in an abutment engagable with said object restraint surface and facing the direction of the second end of said shaft, said plunger further defining a transitional angle forming a laterally extending shoulder on at least one side of the plunger at a point where the configuration of the plunger changes from cylindrical to wedge-shaped;

biasing means disposed in said re-entrant bore biasing said plunger outwardly of said bore;

said shaft being staked on at least one side of the entrance of said re-entrant bore to provide an inwardly extending marginal portion in an abutting relationship with said shoulder, whereby said plunger is nonrotatably retained in said bore.

* * * * *